United States Patent
Vincent et al.

(10) Patent No.: US 7,476,866 B2
(45) Date of Patent: Jan. 13, 2009

(54) APPARATUS AND METHOD FOR DETECTION OF VACUUM ULTRAVIOLET RADIATION

(75) Inventors: Francois Vincent, Echallens (CH); Antonio Cabras, St. Prex (CH)

(73) Assignee: Thermo Fisher Scientific Inc., Waltham, MA (US)

( * ) Notice: Subject to any disclaimer, the term of this patent is extended or adjusted under 35 U.S.C. 154(b) by 174 days.

(21) Appl. No.: 10/570,863

(22) PCT Filed: Sep. 3, 2004

(86) PCT No.: PCT/EP2004/009821

§ 371 (c)(1),
(2), (4) Date: Mar. 7, 2006

(87) PCT Pub. No.: WO2005/024361

PCT Pub. Date: Mar. 17, 2005

(65) Prior Publication Data

US 2006/0289778 A1    Dec. 28, 2006

(30) Foreign Application Priority Data

Sep. 9, 2003   (GB) ................. 0321070.5

(51) Int. Cl.
   *G01J 1/42* (2006.01)
(52) U.S. Cl. .................................... 250/372
(58) Field of Classification Search ................ 250/372
   See application file for complete search history.

(56) References Cited

U.S. PATENT DOCUMENTS

| | | |
|---|---|---|
| 4,322,165 A | 3/1982 | Ellebracht et al. |
| 5,225,681 A | 7/1993 | Falk et al. |
| 5,506,149 A | 4/1996 | Crawford et al. |
| 6,219,368 B1 * | 4/2001 | Govorkov ..................... 372/59 |
| 6,327,290 B1 * | 12/2001 | Govorkov et al. ............. 372/61 |
| 6,624,424 B2 * | 9/2003 | Eckert et al. ................. 250/372 |
| 2001/0048074 A1 * | 12/2001 | Shiokawa et al. ........... 250/286 |
| 2002/0149774 A1 | 10/2002 | McAninch |
| 2003/0150997 A1 | 8/2003 | Eckert et al. |
| 2005/0184248 A1 * | 8/2005 | Kanazawa et al. .......... 250/372 |

FOREIGN PATENT DOCUMENTS

DD   294094 A5   9/1991

(Continued)

OTHER PUBLICATIONS

Search Report for GB 0321070.5, dated Jan. 23, 2004.

(Continued)

*Primary Examiner*—Christine Sung
(74) *Attorney, Agent, or Firm*—Haynes and Boone, LLP

(57) ABSTRACT

Vacuum ultraviolet radiation detection apparatus (10) comprises a radiation detector (30) in a chamber (12). The detector (30) receives ultraviolet radiation from a radiation source (36). The chamber is evacuated using a dry vacuum pump (18) to a relatively poor vacuum of no less than 5 Pa. UV transparent gas is supplied from a gas supply (26), into the chamber (12) at a relatively low flow rate (around 0.1 liters/minute) so as to provide an overall pressure in the chamber (12) of between 100 and 1,000 Pa. The use of a relatively inexpensive pump coupled with a lower gas flow rate provides significant cost savings.

20 Claims, 1 Drawing Sheet

FOREIGN PATENT DOCUMENTS

JP              8022129 A      1/1996

OTHER PUBLICATIONS

International Search Report and Written Opinion of Searching Authority for PCT/EP2004/009821, dated Dec. 21, 2004.

Nakahara, Taketoshi, "Determination of phosphorus in steels and copper metals by vacuum ultraviolet atomic emission spectrometry with inductively coupled plasma", Spectrochimica Acta, vol. 40B, Nos. 1 / 2, pp. 293-300, Great Britain, 1985.

Kirkbright, G.F. et al., "Atomic emission spectrometry with an induction-coupled high-frequency plasma source, The determination of iodine, mercury, arsenic and selenium"; Analytica Chimica Acta, vol. 64, pp. 353-362, Amsterdam, 1973.

Kirkbright, G.F. et al., "The determination of sulphur and phosphorus by atomic emission spectrometry with an induction-coupled high-frequency plasma source", Analytica Chimica Acta, vol. 62, pp. 241-251, Amsterdam, 1972.

Lee, J., et al., "Spectral interference on the emission of sulphur 1 180.73 nm in an inductively coupled plasma", Spectrochimica, Acta, vol. 36B, No. 6, pp. 591-594, Great Britain, 1981.

Hayakawa, L, et al., "The determination of I, P, B, S, As and Sn by inductively couple plasma emission spectroscopy using lines at vacuum ultra-violet wavelengths", Spectrochimica Acta, vol. 37B, No. 12, pp. 1069-1073, Great Britain, 1982.

"Spectro Releases New Technology Report: Vacuum ultraviolet wavelength (VUV) coverage using the Spectro Ciros CCD ICP", Nov. 5, 2001, Kleve, Germany, 2 pages.

\* cited by examiner

APPARATUS AND METHOD FOR DETECTION OF VACUUM ULTRAVIOLET RADIATION

This application claims benefit of Patent Cooperation Treaty Application Number PCT/EP2004/009821, filed Sep. 3, 2004, which claims priority from Great Britain Patent Application Number 0321070.5, filed Sep. 9, 2003.

TECHNICAL FIELD OF THE INVENTION

This invention relates to ultraviolet spectroscopy. In particular, but not exclusively, this invention relates to detecting vacuum ultraviolet (VUV) radiation and atomic emission spectra in the VUV region of the electromagnetic spectrum.

BACKGROUND TO THE INVENTION

Ultraviolet (UV) radiation is electromagnetic radiation lying between the visible and X-ray regions of the spectrum, that is between 380 nm and 5 nm. Vacuum ultraviolet (VUV) radiation is part of the UV region of the spectrum in which radiation is absorbed by air. As a result, any experiments arranged to detect this VUV radiation are usually performed in a vacuum. The wavelength of VUV radiation is less than 200 nm.

Atomic emission spectroscopy is a well known technique used to determine constituent molecules or atoms of a sample. When atoms excited to a high energy state relax to a lower energy state, or to the ground energy state, photons are emitted. The wavelength of the emitted photons correlates to the energy gap between the excited state from which the atom relaxed and the relaxation state to which they decay. Different atomic species have distinct atomic emission spectrum, and so detection of the spectra can be used to determine constituents of a sample.

The so-called emission lines are generally in the infrared, visible and ultraviolet bands of the electromagnetic spectrum. There is particular interest in detecting atomic emission lines within the vacuum ultraviolet region.

Presently, spectral analytical systems using atomic emission radiation sources introduce the sample material to be analysed into an excitation region. Here it is excited to spectroemissive levels sufficient to emit detectable radiation which is characteristic of elements in the sample. The resulting emitted radiation is typically disbursed using a grating or refracting element and analysed spectroscopically to determine quantitatively the elemental composition of a sample. To avoid the absorption of radiation below 200 nm by air, and to avoid wavelength shifts associated with changes in the refractive index of gases, the sample material is excited in a gas filled chamber. Various spectrometers can be accommodated in or on the chamber to detect radiation in different wavebands of the electromagnetic spectrum. For instance, a visible waveband spectrometer might be attached to the sample emission chamber so that the spectrometer has a view of the radiation source (excited sample) through an appropriate window.

For detection in the VUV waveband the appropriate spectrometer should be arranged to overcome the absorption and refractive index variation problems described above. Such problems result in a reduction of the sensitivity of the instrument which limits the detection capability of the spectrometer. Also a shift of the spectral lines can result in erroneous measurement of the concentration of elements in the sample. For instance, the problems associated with refractive index might cause the spectral lines to shift across an output detection system such as a CCD array, or an array of photomultipliers, which would require re-calibration of the spectrometer to correctly assign the detected spectral lines to their associated elements.

There have been several attempts to mitigate these problems associated with detecting optical spectra at wavelengths below 200 nm. In a first instance, the optical spectrometer housing or chamber has been evacuated to high levels of vacuum so as to remove virtually all the gases within the spectrometer chamber. An example of such an instrument is the ARL4460 spectrometer sold by Thermo Electron Corporation. The high vacuum is typically achieved by using a two-stage pumping system to evacuate the chamber. The pumping system comprises a primary vacuum pump such as a rotary pump or diaphragm pump arranged in series with a high vacuum pump such as a turbo-molecular pump, the turbo-molecular pump being arranged between the evacuated chamber and the primary vacuum pump.

The two stage pump system is necessary to reduce the pressure in the chamber to less than 0.1 Pa ($10^{-3}$ mbar). This level of vacuum is required to produce sufficient transparency in the evacuated chamber of the optical path. A rotary or diaphragm pump cannot alone achieve the required pressure levels within the spectrometer housing to provide a sufficient level of transparency in the VUV waveband.

This system has several disadvantages, particularly because turbo-molecular pumps are relatively expensive and require regular maintenance. Such a pump cannot operate on its own and must be used in series with a primary vacuum pump adding to the expense and maintenance burden. When the pumps are being serviced or maintained the spectrometer is unable to function.

U.S. Pat. No. 4,322,165 and U.S. Pat. No. 5,506,149 describe a second proposed solution to the problem, wherein the spectrometer is continuously purged with a UV-transparent gas so as to expel UV absorbing gases from the instrument. The gas is required to be of a particularly high degree of purity, and flow rates through the instrument are relatively high (typically in the range of 0.5-5 liters per minute). Such gases are relatively expensive because of the high purity required, and the rate of consumption of the gas makes the cost of purging the gas one of the highest consumable costs for a laboratory using such spectrometers. This type of system does not, however, require high vacuum pumping systems.

U.S. Pat. No. 5,225,681 attempts to overcome the problems discussed above by filling a sealed spectrometer housing with UV-transparent gas. A gas pumping system is required to cycle the gas through a gas cleaner so as to remove out-gassed material from components within the spectrometer housing. This gas cleaning system is relatively expensive and requires regular replacement. If no gas cleaning system is used, the UV-transparent gas becomes progressively contaminated with UV-absorbent gases and the spectrometer performance can be compromised. During its working life, the gas cleaning system requires regular maintenance during which the spectrometer cannot function.

Furthermore, the system relies on the spectrometer housing being gas tight. Any small leaks cause the pressure in the housing to change, which in turn causes the refractive index of the gas within the system to vary resulting in a shift in wavelength of detected spectral lines.

Furthermore, the absence of a high vacuum pump causes further problems since, whenever the components within the housing require maintenance, the housing must be breached and the high purity gas is lost as the housing fills with air. The housing must first be evacuated to a high vacuum before it can be refilled with the high purity transparent gas, which requires a high vacuum pump. Thus, either the system must be permanently fitted with a high vacuum pump or an appropriate pump must be provided and fitted to the system to evacuate the chamber before the spectroanalyser can operate following any maintenance of the system. This refilling process is extremely time consuming, and of course the spectrometer cannot function during this period.

A further system sold by Hilger Analytical Limited (of England) under the trading name Polyvac® uses a medium-vacuum two-stage rotary vane pump to evacuate the spectrometer housing to approximately 1 Pa ($10^{-3}$ mbar). The rotary vane pump uses oil in the pump to achieve the medium vacuum in the spectrometer housing. Such a pump system is known as a "wet pump". At the medium vacuum pressure the residual gas components are relatively low in concentration and the passage of UV radiation at wavelengths substantially above 140 nm can occur without significant attenuation.

However, oil from the rotary vane pump can enter the system and contaminate optical components or affect the refractive index of the gas within the spectrometer. To reduce this so-called "backstreaming" of the rotary vane pump oil into the housing, the spectrometer housing is fed with a supply of high purity argon gas. The overall pressure in the housing is typically 12.5 to 25 Pa (0.125 to 0.25 mbar) when the argon gas is introduced. Furthermore, the ultimate vacuum produced by a rotary vane pump is not particularly stable. As the quantities of residual gases in the chamber are at levels where they can still affect the transmission of wavelengths below 200 nm, variation of the chamber pressure due to the variation in performance of the pump will give rise to varying degrees of absorption, compromising the stability of the spectrometer at UV wavelengths. The supply of the high purity argon gas helps to stabilise the gas pressure within the spectrometer chamber and thereby stablises to some degree, the UV transparency.

The two stage rotary vane pump is relatively expensive. Furthermore, purging of the system using argon only reduces the risk of optical contamination by the oil backstreaming from the rotary vane pump; such oil contamination is by no means eliminated in this system.

SUMMARY OF THE INVENTION

The present invention aims to ameliorate the problems associated with the prior art and provide a spectrometer or spectroscopy method which provides an improvement on the prior art systems.

Accordingly, the present invention in a first aspect provides vacuum ultraviolet radiation detection apparatus, comprising; a radiation detector arranged to receive ultraviolet radiation from a radiation source, a chamber in which said detector is disposed, a dry vacuum pump arranged to evacuate the chamber to a pressure no lower than about 5 Pa (0.05 mbar), and a gas supply means arranged to supply a substantially UV transparent gas into the chamber through a chamber inlet port.

A dry pump has two primary advantages over the Polyvac® system in particular. Firstly, it does not require oil and so the problem of backstreaming is addressed. Secondly, it is relatively less costly than a rotary vane pump or turbomolecular pump.

Nevertheless, currently available dry pumps are only able to produce a relatively poor vacuum. At or above 5 Pascals, the minimum pressure that the dry pump can typically achieve, emitted radiation experiences significant absorption. As a result, dry pumps (at least without further assistance) have previously been considered unusable in VUV spectral analysis.

The inventors have found, surprisingly, that by addition of a substantially UV transparent gas to the chamber, absorption of UV radiation below about 200 nm by the residual atmospheric gases (which the dry pump is unable to extract) is significantly reduced, such that the system operates successfully even with a dry pump.

By "dry pump" is meant a pump which does not require the use of oil or any other liquid to operate.

According to a second aspect of the present invention there is provided vacuum ultraviolet radiation detection apparatus, comprising a radiation detector arranged to receive ultraviolet radiation from a radiation source, a chamber in which said detector is disposed, a pump arranged to evacuate the chamber, and a gas supply means arranged to supply a substantially UV transparent gas into the chamber through a chamber inlet port, at a flow rate which is such as to provide an overall pressure in the chamber of between 100 and 10,000 Pa (1 to 100 mbar).

UV transparent gas is relatively expensive. The present invention thus addresses the problem of prior art arrangements such as the US patents identified in the introduction above, which tend to use large quantities of purging gases.

A much lower (at least 5-6 times lower) flow rate of UV transparent gas is employed in the present invention, coupled with a pump to evacuate the chamber (the above-mentioned prior art tends to operate at or around atmospheric pressure). In a preferred embodiment, the pump may be a dry pump or the like which further reduces the cost over and above the annual running cost reduction through a decrease in consumables. Whilst the flow rate of UV transparent gas is, in the present invention, somewhat higher than that of the Polyvac® system described above, it will be noted that the gas flow in the Polyvac® system is not intended to operate in combination with a vacuum so as to prevent absorption but is instead essentially to prevent backstreaming of pump oil vapour.

The gas supply means is, in preference, arranged to supply a flow of gas to the chamber at a rate of about 0.1 liters per minute.

The vacuum pump is preferably arranged to remove the UV-transparent gas from the housing and the UV-transparent gas is not re-circulated.

Preferably, the apparatus can also comprise radiation detectors which are operable in other wavebands, such as the near ultraviolet and visible wavebands, in which case the UV-transparent gas should also be substantially transparent in these other operational wavebands.

Preferably, the radiation detector comprises a diffraction grating, such as a holographic diffraction grating, and a CCD array or other detection system arranged to receive diffracted radiation from the grating. The grating is arranged so that radiation from the source impinges on the grating at an angle, to diffract the radiation into its constituent wavelengths.

Whilst the two aspects of the present invention both provide vacuum ultraviolet radiation detection apparatus with cheaper component consumables than the prior art, it will nevertheless be understood that the twin solutions are by no means mutually exclusive and that an apparatus having both a dry pump and a relatively low flow rate of UV transparent gas will provide particular advantages.

The present invention also provides a method of detecting vacuum ultraviolet radiation using a radiation detector disposed in a chamber, said method comprising; evacuating the chamber to a pressure of substantially equal to or greater than 5 Pa (0.05 mbar), supplying a substantially UV-transparent gas into the chamber, and detecting UV radiation impinging on the radiation detector.

In still a further aspect of the present invention, there is provided a method of detecting vacuum ultraviolet radiation using a radiation detector disposed in a chamber, said method comprising evacuating the chamber, supplying a substantially UV transparent gas into the chamber at a rate such as to maintain the pressure in the chamber at between 100 Pa and 10,000 Pa (1 and 100 mbar), and detecting UV radiation impinging on the radiation detector.

BRIEF DESCRIPTION OF THE FIGURES

An embodiment of the present invention is now described by way of example, and with reference to the accompanying drawing, in which.

DESCRIPTION OF AN EMBODIMENT OF THE PRESENT INVENTION

Figure 1:
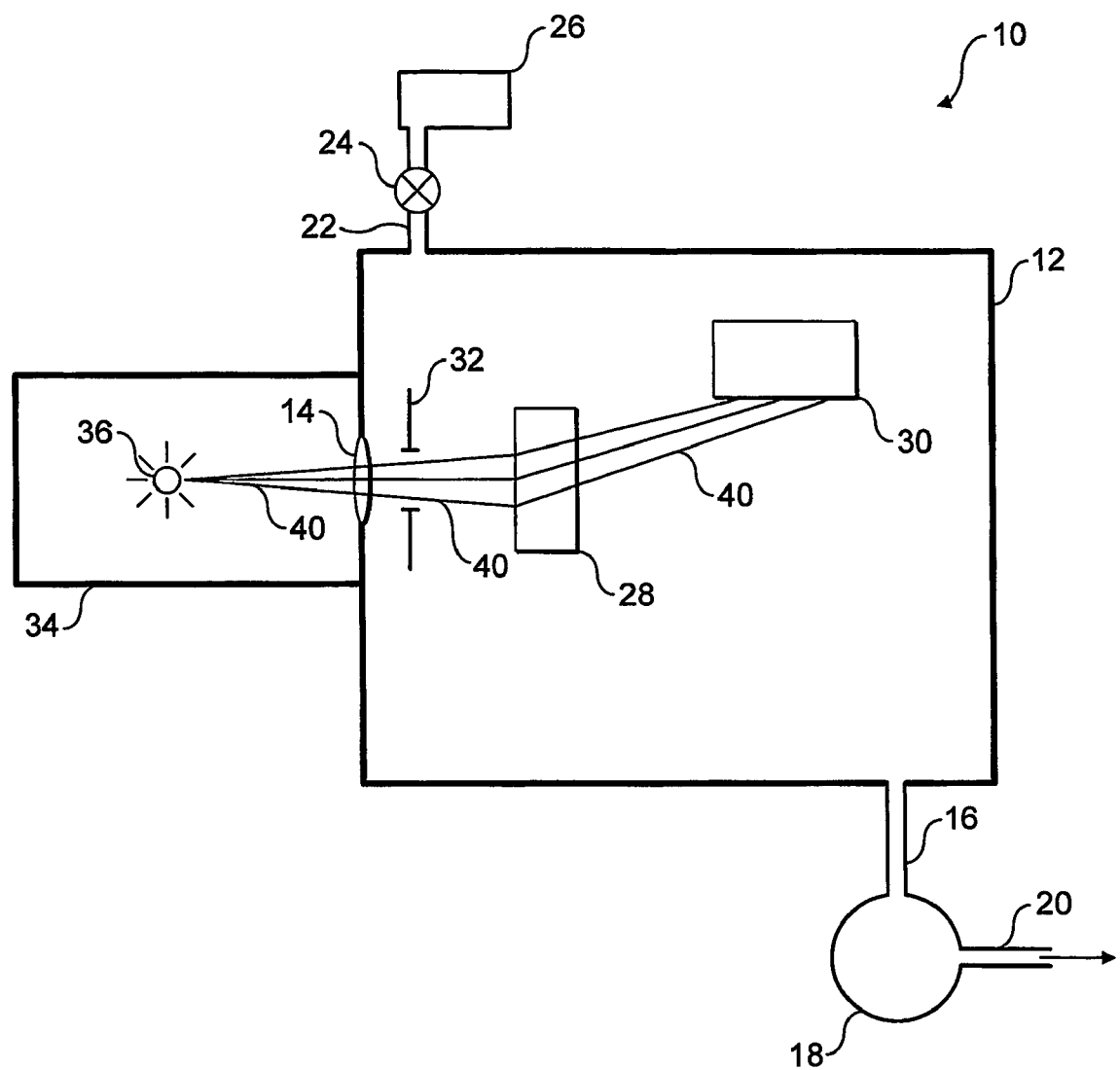
FIG. 1 is a schematic diagram of an apparatus embodying the present invention.

Referring to FIG. 1, apparatus 10 embodying the present invention is shown in highly schematic form. The apparatus comprises a spectrometer housing or chamber 12 with a window 14 on one wall of the housing. The housing comprises an outlet port 16 and a vacuum pump 18 which is arranged to evacuate the housing to low vacuum pressures only. By low vacuum pressure it is meant a vacuum pressure of between atmosphere and 100 Pa (1 mbar). The vacuum pump vents directly to atmosphere via a pump outlet 20.

The housing 12 also comprises an inlet port 22. The inlet port is connected via a valve 24, to a gas supply 26. The gas supply contains a UV transparent gas, such as argon or nitrogen. The valve 24 might be of a solenoid or needle type or a mass flow controller. Other devices allowing an appropriate flow adjustment might be used.

A grating 28, or appropriate diffracting/refracting means, is disposed within the housing 12 such that radiation passing through the window 14 impinges on the grating and is diffracted and dispersed into its constituent wavelengths. A detection system 30 is arranged in the housing such that light diffracted by the grating impinges on the detector. There may be further optical devices within the housing, such as a slit 32, lens systems, or the like.

The housing 12 can be attached to a vessel 34 which houses a source 36 of electromagnetic radiation. The source can comprise a plasma arc into which a sample can be introduced so as to excite the sample to an extent where atomic emission lines are emitted from the sample. Ways and means for exciting the sample to such a state do not form part of the present invention and no further description is required here.

Light emitted from the sample travels along paths indicated by line 40. The light emitted from the source enters the housing 12 through the window 14, passes through the slit 32 and impinges on the diffraction grating 28. Here the light is bent through an angle depending on its wavelength and the diffracting power of the grating 28. From the grating, the light travels to a detection system 30 where it is detected. The detector comprises, for example, a CCD array arranged so that light of a first frequency (or wavelength) impinges at one end of the array and light having gradually higher frequencies impinges along the length of the array to the second end of the array. The system can be calibrated so that discrete frequencies or wavelengths of light only fall on a certain element of the CCD array, according to certain conditions within the housing, for instance.

The vacuum pump operates to evacuate the housing to a pressure of between 10 and 5000 Pa (0.1 and 50 mbar), as measured with no UV-transparent gas in the housing. In this state, the residual gas within the housing comprises components of air that have desorbed from the internal surfaces of the housing, the optical components within the housing and the window 14. In addition, some of the residual gas in the housing is due to backstreaming of air from atmosphere from pump 18 and into the housing 12. Typically, this backstreaming air comprises water vapour, oxygen and carbon dioxide which act to absorb ultraviolet radiation, to lesser or greater extents.

With these unwanted gases in the housing, the spectrometer performance is degraded for wavelengths of light below 200 nm. The limit of detection of elements whose atomic emission spectral lines fall at or below 200 nm is therefore degraded. In some cases this degradation is so large that determining the concentration of elements within the sample under analysis is not possible.

However, by admitting a low flow UV transparent gas into the housing via the inlet 22 the performance of the spectrometer for wavelengths below 200 nm is, surprisingly, greatly improved. It has been found that supplying a gas to the housing at a rate which provides an overall pressure within the housing of between about 100 and 10,000 Pa (1 to 100 mbar) is sufficient to overcome the atmospheric absorption problems. The gas flow rate of ultraviolet transparent gas into the housing is typically 0.1 liters per minute to provide an overall pressure in the housing of some 10 mbar. This flow rate is at least five times lower than the purging gas system of the prior art. At present exchange rates, the reduction in flow of high purity gas provides a typical saving of roughly €2,000 (roughly US$2,250) per year, per spectrometer.

Despite this example of a typical flow rate, it is to be understood that the pressure in the chamber is not directly proportional either to the gas flow rate or the pumping rate and that, whilst adjusting the flow rate will clearly alter the pressure, it is the latter that determines whether or not the atmospheric absorption problems are overcome.

The low vacuum pump 18 is preferably oil free or a so-called "dry pump". An example of such a pump is a diaphragm vacuum pump. This diaphragm pump operates without the need for oil in the pump parts which are exposed to gases being pumped, or partial vacuum. Thus, any gases backstreaming through the pump are free from oil vapour which would, on entering the housing 12, deposit on all internal surfaces, including optical components 14, 28 and 30. Progressive oil vapour deposited on these surfaces reduces their ability to transmit, reflect, diffract, refract or detect light and thereby degrades the spectrometer's performance. As a result, using an oil free pump has the effect that a spectrometer embodying the present invention requires less maintenance to clean optical components within the housing, effectively increasing the operational lifetime of an instrument embodying the present invention.

The continuous flow of ultraviolet transparent gases at relatively low flow rates into the housing serves to sweep out desorbed gases from the internal surfaces of the housing and optical components, it also acts as presenting a relatively high pressure on the vacuum side of the low vacuum pump 18. Thus, the pump is operating at a pressure above its ultimate operational vacuum pressure. The pump continuously pumps the UV transparent gas, along with any desorbed or outgassed material, through the pump to atmosphere. This flow of gases through the pump acts to prevent backstreaming of atmospheric gases from the atmosphere side of the pump into the spectrometer housing.

The use of a low vacuum pump, and particularly a diaphragm pump, provides a cost saving for the manufacture of spectrometer devices embodying the invention without any degradation of spectrometer performance compared to prior art systems. This, coupled with the saving in purge gas costs and low maintenance/high usage capability of an instrument embodying the present invention, can lead to a significant saving over the lifetime of the spectrometer.

The valve 24 can be arranged to cooperate with an orifice restrictor so that the flow rate of gas from container 26 into the housing 12 is controlled at a steady rate. Such orifice restrictors can be procured ready calibrated for certain flow rates of certain gases and will contribute to the stability of the final gas pressure within the spectrometer chamber.

Suitable UV transparent gases include argon or nitrogen, either of which can be procured from specialist gas retailers.

The foregoing is a specific description of a preferred embodiment which is by way of example only and which is not limiting in nature, the scope of protection being defined in the appendant claims. Various modifications can be envisaged by the skilled person. For example, the window 14 may consist of or include a lens or some other form of optical or mechanical device. The spectrometer could be arranged to operate in other wave-bands where atmospheric absorption is problematic. Furthermore, embodiments of the present invention might also be used for other optical experiments outside of the spectroscopy field.

The invention claimed is:

1. Vacuum ultraviolet radiation detection apparatus, comprising;
    a radiation detector arranged to receive ultraviolet radiation from a radiation source,
    a chamber in which said detector is disposed,
    a dry vacuum pump arranged to evacuate the chamber to a pressure substantially equal to or greater than 5 Pa (0.05 mbar), and
    a gas supply means arranged to supply a substantially UV transparent gas into the chamber through a chamber inlet port while the chamber is being evacuated, wherein the overall pressure in the chamber is below atmospheric pressure.

2. Apparatus according to claim 1, wherein the UV transparent gas is arranged to be supplied to the chamber at a substantially continuous rate.

3. Apparatus according to claim 1, wherein the inlet port comprises a valve arranged to control the flow of the UV transparent gas.

4. Apparatus according to claim 1, wherein, during operation, the vacuum pump is arranged to remove the UV transparent gas in the chamber to atmosphere at such a rate, and/or the gas supply means is arranged to supply the gas at such a rate, so as to cause the overall pressure within the chamber to be substantially equal to or greater than 100 Pa (1 mbar).

5. Apparatus according to claim 4, wherein the vacuum pump is arranged to remove the UV transparent gas in the chamber to atmosphere at such a rate, and/or the gas supply means is arranged to supply the gas at such a rate, so as to cause the overall pressure in the chamber to be no more than 10,000 Pa (100 mbar).

6. Apparatus according to claim 4, wherein the gas supply means is arranged to cause gas flow into the chamber at about 0.1 liters/minute.

7. Apparatus according to claim 1, wherein the vacuum pump is a dry diaphragm vacuum pump.

8. Apparatus according to claim 1, wherein the UV-transparent gas is argon, nitrogen, or a combination of argon and nitrogen.

9. Apparatus according to claim 1, wherein the radiation detection apparatus comprises an optical spectrometer.

10. Apparatus according to claim 9, wherein the spectrometer is arranged to detect vacuum ultraviolet radiation and radiation in another waveband.

11. Apparatus according to claim 1, wherein the chamber comprises a window arranged to allow radiation to pass therethrough for detection by the radiation detector.

12. An apparatus according to claim 1, wherein the gas supply means is a non-recirculating gas supply means.

13. An apparatus according to claim 1, wherein the flow rate of the UV transparent gas and the pumping rate of the pump are each greater than zero but sufficiently low so that an overall pressure of between 100 and 10,000 Pa (1 to 100 mbar) is maintained in the chamber.

14. Vacuum ultraviolet radiation detection apparatus, comprising:
    a radiation detector arranged to receive ultraviolet radiation from a radiation source;
    a chamber in which said detector is disposed;
    a pump arranged to evacuate the chamber; and,
    a gas supply means arranged to supply a substantially UV transparent gas into the chamber through a chamber inlet port, the flow rate of the UV transparent gas and the pumping rate of the pump each being greater than zero but sufficiently low that an overall pressure in the chamber of between 100 and 10,000 Pa (1 to 100 mbar) is maintained.

15. A method of detecting vacuum ultraviolet radiation using a radiation detector disposed in a chamber, said method comprising;
    evacuating the chamber to a pressure of substantially equal to or greater than 5 Pa (0.05 mbar),
    supplying a substantially UV-transparent gas into the chamber while the chamber is being evacuated, such that the overall pressure in the chamber is below atmospheric pressure, and
    detecting UV radiation impinging on the radiation detector.

16. A method according to claim 15, wherein the UV-transparent gas is supplied to the chamber at such a rate, and/or the chamber is evacuated at such a rate, that the overall pressure in the chamber is substantially equal to or greater than 100 Pa (1 mbar) during the vacuum pump's operation.

17. The method of claim 16, wherein the UV transparent gas is supplied to the chamber at such a rate, and/or the chamber is evacuated at such a rate, that the overall pressure in the chamber is no more than 10,000 Pa (100 mbar).

18. The method of claim 14, wherein the gas is supplied to the chamber at a rate of about 0.1 liters/minute.

19. A method of detecting vacuum ultraviolet radiation using a radiation detector disposed in a chamber, said method comprising:
    evacuating the chamber;
    supplying a substantially UV transparent gas into the chamber while the chamber is being evacuated, the flow rate of the UV transparent gas and the rate of evacuation of the chamber each being greater than zero but sufficiently low that the pressure in the chamber is maintained between 100 Pa and 10,000 Pa (1 and 100 mbar); and
    detecting UV radiation impinging on the radiation detector.

20. A method according to claim 15, wherein the UV-transparent gas is removed from the chamber by the vacuum pump.

* * * * *